(12) United States Patent
Takagi et al.

(10) Patent No.: US 12,381,366 B2
(45) Date of Patent: Aug. 5, 2025

(54) ELECTRICAL CONNECTOR WITH TERMINAL CONNECTED TO WIRE CONDUCTOR IN SEALED HOUSING

(71) Applicant: Yazaki Corporation, Tokyo (JP)

(72) Inventors: Hiromitsu Takagi, Shizuoka (JP); Hiroshi Hirata, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 321 days.

(21) Appl. No.: 18/304,438

(22) Filed: Apr. 21, 2023

(65) Prior Publication Data
US 2023/0344184 A1 Oct. 26, 2023

(30) Foreign Application Priority Data
Apr. 25, 2022 (JP) .................. 2022-071576

(51) Int. Cl.
*H01R 43/00* (2006.01)
*H01R 13/502* (2006.01)
(Continued)

(52) U.S. Cl.
CPC ......... *H01R 43/005* (2013.01); *H01R 13/502* (2013.01); *H01R 13/5205* (2013.01); *H01R 24/00* (2013.01); *H01R 43/0221* (2013.01); *H01R 13/10* (2013.01); *H01R 13/504* (2013.01); *H01R 13/52* (2013.01); *H01R 13/5202* (2013.01); *H01R 13/5219* (2013.01); *H01R 13/5221* (2013.01); *H01R 13/5804* (2013.01);
(Continued)

(58) Field of Classification Search
CPC ............... H01R 43/005; H01R 13/502; H01R 13/5205; H01R 24/00; H01R 43/0221; H01R 13/10; H01R 13/504; H01R 13/52; H01R 13/5202; H01R 13/5219; H01R 13/5804; H01R 13/5812; H01R 24/20; H01R 24/28; H01R 43/02; H02G 3/088
See application file for complete search history.

(56) References Cited

U.S. PATENT DOCUMENTS 11,828,126 B2 * 11/2023 Van Mook .......... E21B 33/0385
2016/0006165 A1 1/2016 Becker

FOREIGN PATENT DOCUMENTS

| JP | 2009-21121 A | 1/2009 |
|---|---|---|
| JP | 2010-211935 A | 9/2010 |

(Continued)

*Primary Examiner* — Justin M Kratt
(74) *Attorney, Agent, or Firm* — Sughrue Mion, PLLC

(57) ABSTRACT

A connector includes a coated electric wire, a connector terminal, a connector housing, and a holder. The connector housing includes an insertion portion having an insertion hole in which the coated electric wire is inserted, a housing portion that surrounds a periphery of the terminal portion of the coated electric wire inserted in the insertion hole, and an electric wire covering portion that protrudes to a back surface side of the insertion portion and covers an outer circumference of a coating portion of the coated electric wire. The holder includes a housing holding portion that holds an outer surface of the electric wire covering portion and an electric wire holding portion that holds an outer circumference of at least a part of the coating portion of the coated electric wire protruding from the electric wire covering portion to a back surface side.

6 Claims, 3 Drawing Sheets

(51) Int. Cl.
  *H01R 13/52*  (2006.01)
  *H01R 24/00*  (2011.01)
  *H01R 43/02*  (2006.01)
  *H01R 13/10*  (2006.01)
  *H01R 13/504*  (2006.01)
  *H01R 13/58*  (2006.01)
  *H01R 24/20*  (2011.01)
  *H01R 24/28*  (2011.01)
  *H02G 3/08*  (2006.01)

(52) U.S. Cl.
  CPC .......... *H01R 13/5812* (2013.01); *H01R 24/20* (2013.01); *H01R 24/28* (2013.01); *H01R 43/02* (2013.01); *H02G 3/088* (2013.01)

(56) References Cited

FOREIGN PATENT DOCUMENTS

JP  2011-211935 A  10/2011
JP  2017-525101 A  8/2017

\* cited by examiner

ELECTRICAL CONNECTOR WITH TERMINAL CONNECTED TO WIRE CONDUCTOR IN SEALED HOUSING

CROSS-REFERENCE TO RELATED APPLICATIONS

The present application is based on, and claims priority from the prior Japanese Patent Application No. 2022-071576, filed on Apr. 25, 2022, the entire contents of which are incorporated herein by reference.

TECHNICAL FIELD

The present disclosure relates to a connector.

BACKGROUND

Hitherto, there has been known a connector including an electric wire, a connector housing that surrounds a periphery of a terminal connected to the inserted electric wire, and holder that fixes the electric wire inside the connector housing.

JP 2010-211935 A discloses a potting-type connector including a potting portion filled with silicon for waterproofing a connection portion between an electric wire and a terminal that constitute the connector. Further, J P 2010-211935 A discloses a rubber stopper-type connector using a rubber stopper in place of the potting portion.

SUMMARY

However, the potting-type connector and the rubber stopper-type connector in JP2010-211935A have a problem that the connectors are enlarged due to the potting portion filled with a potting material such as silicon and the rubber stopper.

The present disclosure has been made in view of the problem in the related art. An object of the present disclosure is to provide a connector that is waterproof, includes the small number of components, and achieves space saving.

A connector according to an aspect of the present disclosure includes: a coated electric wire including a core wire portion and a coating portion that covers an outer circumference of the core wire portion; a connector terminal including a connection portion that is connected to a terminal portion of the coated electric wire and is connected to an external member; a connector housing including: an insertion portion having an insertion hole in which the coated electric wire is inserted; a housing portion that is provided to extend from the insertion portion to a front surface side, and surrounds a periphery of the terminal portion of the coated electric wire inserted in the insertion hole; and an electric wire covering portion that is provided to extend in such a way that an inner wall surface of the insertion hole protrudes to a back surface side of the insertion portion, and covers an outer circumference of the coating portion of the coated electric wire; and a holder including: a housing holding portion that holds an outer surface of the electric wire covering portion; and an electric wire holding portion that holds an outer circumference of at least a part of the coating portion of the coated electric wire protruding from the electric wire covering portion to a back surface side, wherein sealing between the housing holding portion of the holder and the electric wire covering portion of the connector housing and sealing between the electric wire holding portion of the holder and the coating portion of the coated electric wire are performed by laser welding.

According to the present disclosure, it is possible to provide the connector that is waterproof, includes the small number of components, and achieves space saving.

DETAILED DESCRIPTION

Figure 1:
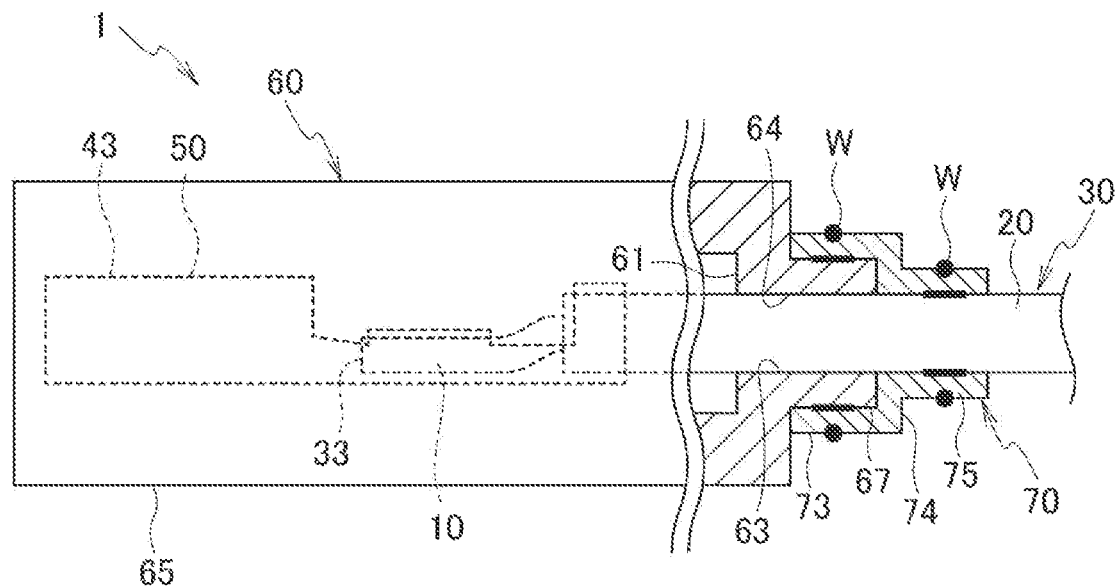
FIG. 1 is a cross-sectional view illustrating an example of a connector according to the present embodiment.

Various embodiments will be described hereinafter with reference to the accompanying drawings.

A connector according to the present embodiment is described below in detail with reference to the drawings. Note that a dimension ratio in the drawings is exaggerated for convenience of description, and may be different from the actual ratio in some cases.

[Connector]

Figure 2:
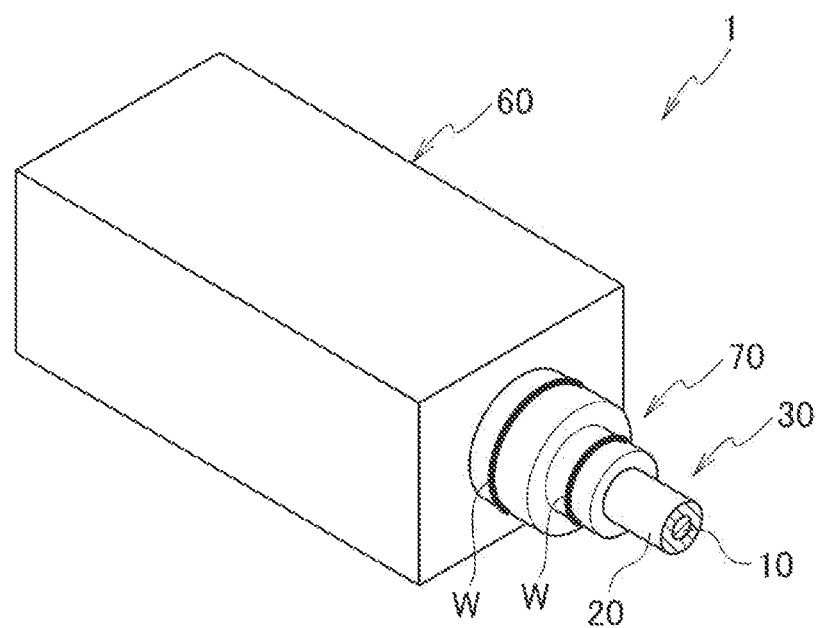
FIG. 2 is a perspective view illustrating an example of the connector according to the present embodiment.

FIG. 1 is a cross-sectional view illustrating an example of a connector according to the present embodiment. FIG. 2 is a perspective view illustrating an example of the connector according to the present embodiment. A connector 1 illustrated in FIG. 1 includes a coated electric wire 30, a connector terminal 50, a connector housing 60, and a holder 70.

The holder 70 includes a housing holding portion 73 that holds an outer surface of an electric wire covering portion 67 and an electric wire holding portion 75 that holds an outer circumference of at least a part of a coating portion 20 of the coated electric wire protruding from the electric wire covering portion 67 to a back surface side. As illustrated in FIG. 1 and FIG. 2, the holder 70 is an integrated member that holds the outer surface of the part of the connector housing 60 and the outer circumference of at least a part of the coating portion 20 of the coated electric wire 30 protruding from the connector housing 60 to the back surface side.

In the connector 1, laser light entering the holder 70 from the outer surface of the holder 70 arrives at the outer surface of the connector housing 60 and the outer circumference of the coating portion 20 of the coated electric wire 30, and thus the holder 70 and the adjacent member are laser-welded to each other.

Specifically, in the connector 1, at least sealing between the housing holding portion 73 of the holder 70 and the electric wire covering portion 67 of the connector housing 60 is performed by laser welding. Further, in the connector 1, sealing between the electric wire holding portion 75 of the holder 70 and the coating portion 20 of the coated electric wire 30 is performed. With this, the connector 1 is a connector that is waterproof, includes the small number of components, and achieves space saving. The connector 1 is specifically described below.

(Coated Electric Wire)

The coated electric wire 30 includes a core wire portion 10 and the coating portion 20 that coats an outer circumference of the core wire portion 10.

<Core Wire Portion>

The core wire portion 10 is formed of a semiconductor. The core wire portion is not particularly limited, but is formed of a compressed strand wire conductor obtained by compressing a plurality of strand wires, for example. The material of the wires is not particularly limited, and aluminum, copper, or the like is used.

<Coating Portion>

The coating portion 20 is a member that coats the outer circumference of the core wire portion 10. As the material of the coating portion 20, a material capable of coating the core wire portion 10 is used. For example, as the material of the coating portion 20, a thermoplastic resin is used. Examples of the thermoplastic resin include polyvinyl chloride (PVC), polyethylene (PE), polypropylene (PP), and a fluorocarbon resin (PTFE).

Note that the coating portion 20 preferably has a low laser transmittance because energy sufficient for laser welding is easily supplied to the outer circumference of the coating portion 20 without causing burning or the like on the holder 70 due to laser light.

Here, the laser transmittance indicates a transmittance T (%) of laser light having a wavelength from 800 nm to 1,100 nm. The transmittance T is calculated as a result of $I/I_0$, where $I_0$ is an radiant exitance of incident light and I is an radiant existence of transmission light. In general, a laser transmittance changes depending on a material of a member through which laser light is transmitted and a thickness in a transmission direction of laser light. For example, even in a case of the member formed of the same material, as a thickness thereof in a transmission direction of laser light is smaller, a laser transmittance is higher.

The laser transmittance of the coating portion 20 is, for example, less than 20%, preferably, less than 10%, more preferably, less than 5%. When the laser transmittance of the coating portion 20 falls within the above-mentioned range, energy sufficient for laser welding is easily supplied to the outer circumference of the coating portion 20 without causing burning or the like on the holder 70 due to laser light, which is preferred.

As a material of the coating portion 20 having a laser light absorbing property, a light absorbing mixture containing the above-mentioned thermoplastic resin and a light absorbing agent such as carbon black and a coloring agent is used. When the light absorbing material is carbon black, the light absorbing mixture contains the light absorbing material in an amount of, for example, 0.5 mass % that does not affect a physical property, for example, preferably 1.0 mass % or lower.

As illustrated in FIG. 1, the connector terminal 50 is connected to one terminal portion 33 of the coated electric wire 30 in the longitudinal direction.

(Connector Terminal)

The connector terminal 50 includes a connection portion 43 that is connected to the terminal portion 33 of the coated electric wire 30 and is connected to an external member. The shape of the connector terminal 50 is not limited to a particular shape as long as the connection portion 43 connected to the external member is included as connection to the terminal portion 33 of the coated electric wire 30 is established. The connector terminal 50 illustrated in FIG. 1 is an example of a structure of crimping the core wire portion 10 at the terminal portion 33 of the coated electric wire 30 to a side opposite to the connection portion 43 in the longitudinal direction. In general, the connector terminal 50 is arranged in a space formed inside a housing portion 65 of the connector housing 60.

(Connector Housing)

The connector housing 60 includes an insertion portion 61, the housing portion 65, and the electric wire covering portion 67.

<Insertion Portion>

The insertion portion 61 is a portion having an insertion hole 63 in which the coated electric wire 30 is inserted. As illustrated in FIG. 1 and FIG. 2, the insertion portion 61 is a plate-like member having the insertion hole 63. Note that, in addition to the insertion portion 61 having a plate-like shape, the connector housing 60 includes the housing portion 65 that is provided to extend from the insertion portion 61 to a front surface side and surrounds a periphery of the terminal portion 33 of the coated electric wire 30 inserted in the insertion hole 63. Thus, the connector housing 60 as a whole has a box-like shape having an opening portion in which an external member is inserted.

<Housing Portion>

The housing portion 65 is a portion that is provided to extend from the insertion portion 61 to the front surface side and surrounds the periphery of the terminal portion 33 of the coated electric wire 30 inserted in the insertion hole 63. Here, "the front surface side" indicates a side of the terminal portion 33 of the coated electric wire 30 inserted in the insertion hole 63 as viewed from the insertion hole 63 of the insertion portion 61. Thus, for example, the connector terminal 50 connected to the terminal portion 33 of the coated electric wire 30 is arranged on "the front surface side" with respect to the insertion portion 61.

As illustrated in FIG. 1 and FIG. 2, the housing portion 65 has a box-like shape having an opening portion in which an external member is inserted. In the housing portion 65, the terminal portion 33 of the coated electric wire 30 and the connector terminal 50 are arranged in the space formed inside the box-like shape.

<Electric Wire Covering Portion>

The electric wire covering portion 67 is a portion that is provided to extend in such a way that an inner wall surface 64 of the insertion hole 63 of the insertion portion 61 protrudes to the back surface side of the insertion portion 61 and covers the outer circumference of the coating portion 20 of the coated electric wire 30.

As illustrated in FIG. 1, the electric wire covering portion 67 has a cylindrical shape that is provided to extend in such a way that the inner wall surface 64 of the insertion hole 63 of the insertion portion 61 protrudes to the back surface side of the insertion portion 61 and covers the outer circumference of the coating portion 20 of the coated electric wire 30.

When the thickness of the electric wire covering portion 67 is 2.0 mm or smaller, the above-mentioned laser transmittance of the electric wire covering portion 67 is more likely to be 20% or higher. Thus, when the thickness of the electric wire covering portion 67 is 2.0 mm or smaller, energy sufficient for laser welding is easily supplied to the outer surface of the electric wire covering portion 67 of the connector housing 60 without causing burning or the like on the holder 70 due to laser light, which is preferred.

Further, when the thickness of the electric wire covering portion 67 is 2.0 mm or smaller, part of laser light is easily transmitted through the electric wire covering portion 67 of the connector housing 60, and thus the coating portion 20 of the coated electric wire is easily irradiated. Therefore, when the thickness of the electric wire covering portion 67 is 2.0 mm or smaller, energy sufficient for laser welding is easily supplied to the outer circumference of the coating portion 20 of the coated electric wire 30, which is preferred.

<Transmittance>

The above-mentioned laser transmittance of the connector housing 60 is preferably 10% or lower because energy sufficient for laser welding is easily supplied to the outer surface of the connector housing 60 without causing burning or the like on the holder 70 due to laser light.

For example, as the material of the connector housing 60, a general thermoplastic resin is used. Examples of the general thermoplastic resin includes polypropylene (PP), polybutylene terephthalate (PBT), polyamide (PA), polyoxymethylene (POM), polyphenylene sulfide (PPS), syndiotactic polystyrene (SPS), and a liquid crystal polymer (LCP).

Further, as the material of the connector housing 60, a polymer alloy containing the above-mentioned general thermoplastic resin and a highly amorphous material may be used. Examples of the highly amorphous material include acrylonitrile-styrene (AS) and polycarbonate (PC).

(Holder)

The holder 70 includes the housing holding portion 73 and the electric wire holding portion 75.

<Housing Holding Portion>

The housing holding portion 73 is a portion that holds the outer surface of the electric wire covering portion 67 of the connector housing 60.

As illustrated in FIG. 1 and FIG. 2, the housing holding portion 73 is a cylindrical body that holds the outer surface the electric wire covering portion 67 having a cylindrical shape. The outer diameter of the housing holding portion 73 having a cylindrical shape is larger than the outer diameter of the electric wire holding portion 75 having a cylinder shape. This is because the outer diameter of the electric wire covering portion 67 held by the housing holding portion 73 is larger than the outer diameter of the coating portion 20 of the coated electric wire 30 held by the electric wire holding portion 75.

When the thickness of the housing holding portion 73 is 2.0 mm or smaller, the above-mentioned laser transmittance of the housing holding portion 73 is more likely to be 20% or higher. Thus, when the thickness of the housing holding portion 73 is 2.0 mm or smaller, energy sufficient for laser welding is easily supplied to the outer surface of the connector housing 60 without causing burning or the like on the holder 70 due to laser light, which is preferred.

It is desired that a gap between the inner surface of the housing holding portion 73 and the outer surface of the electric wire covering portion 67 of the connector housing 60 be 0.1 mm or smaller in general. Preferably, the gap is 0.05 mm or smaller. As the gap is smaller, sealability at the laser-welded portion between the housing holding portion 73 and the electric wire covering portion 67 is easily improved more, which is preferred.

<Electric Wire Holding Portion>

The electric wire holding portion 75 is a portion that holds the outer circumference of at least a part of the coating portion 20 of the coated electric wire 30 protruding from the electric wire covering portion 67 of the connector housing 60 to the back surface side.

As illustrated in FIG. 1 and FIG. 2, the electric wire holding portion 75 is a cylindrical body that holds the outer circumference of at least a part of the coating portion 20 of the coated electric wire 30 protruding from the electric wire covering portion 67 of the connector housing 60 to the back surface side. The outer diameter of the electric wire holding portion 75 having a cylinder shape is smaller than the outer diameter of the housing holding portion 73 having a cylindrical shape. This is because the outer diameter of the coating portion 20 of the coated electric wire 30 held by the electric wire holding portion 75 is smaller than outer diameter of the electric wire covering portion 67 held by the housing holding portion 73.

When the thickness of the electric wire holding portion 75 is 2.0 mm or smaller, the above-mentioned laser transmittance of the electric wire holding portion 75 is more likely to be 20% or higher. Thus, when the thickness of the electric wire holding portion 75 is 2.0 mm or smaller, energy sufficient for laser welding is easily supplied to the outer circumference of the coating portion 20 of the coated electric wire 30 without causing burning or the like on the holder 70 due to laser light, which is preferred.

It is desired that a gap between the inner surface of the electric wire holding portion 75 and the outer circumference of at least a part of the coating portion 20 of the coated electric wire 30 protruding from the electric wire covering portion 67 of the connector housing 60 to the back surface side be 0.1 mm or smaller in general. As the gap is smaller, sealability at the laser-welded portion between the electric wire holding portion 75 and the coating portion 20 of the coated electric wire 30 easily improved more, which is preferred.

As illustrated in FIG. 1 and FIG. 2, in the holder 70, the housing holding portion 73, the electric wire holding portion 75, and a holder connection portion 74 that connects the housing holding portion 73 and the electric wire holding portion 75 to each other are integrated with one another. More specifically, in the holder 70, the housing holding portion 73 having a cylindrical shape and the electric wire holding portion 75 having a cylindrical shape with a diameter smaller than the housing holding portion 73 are connected to each other in the longitudinal direction via the holder connection portion 74 having a ring shape, and thus are integrated.

<Transmittance>

When the laser transmittance of the holder 70 is 20% or higher, energy sufficient for laser welding is easily supplied to the outer surface of the connector housing 60 and the outer circumference of the coating portion 20 of the coated electric wire 30 without causing burning or the like on the holder 70 due to laser light, which is preferred. As the material of the holder 70, for examples, the material similar to the connector housing 60 is used. Note that, similarly to the material of the connector housing 60, as the material of the holder 70, a polymer alloy containing the above-mentioned general thermoplastic resin and a highly amorphous material may be used. When the above-mentioned polymer alloy is used as the material of the holder 70, the laser transmittance is more likely to be 20% or higher, which is preferred.

<Laser Welding>

As illustrated in FIG. 1 and FIG. 2, in the connector 1, laser light with which a laser irradiation portion W of the outer surface of the holder 70 is irradiated enters the holder 70. The laser light entering the holder 70 is transmitted through the holder 70, and arrives at the outer surface of the electric wire covering portion 67 of the connector housing 60 and the outer circumference of the coating portion 20 of the coated electric wire 30.

The laser light arriving at the outer surface of the electric wire covering portion 67 softens the holder 70 and the electric wire covering portion 67 through which the laser light is transmitted, and then welds those portions. The laser light arriving at the outer circumference of the coating portion 20 of the coated electric wire 30 softens the holder 70 and the coating portion 20 through which the laser light is transmitted, and then welds these portions.

With laser welding through use of a laser beam, the outer surface of the connector housing 60 and the outer circumference of the coating portion 20 of the coated electric wire 30 can instantaneously be melted, and hence a welding speed is high, which is preferred. Further, with a laser beam, the laser irradiation portion W can be melted at a pin point, and hence uneven welding is suppressed, which is preferred.

A type of laser light used for laser welding is not particularly limited, and a solid-state laser, a fiber laser, a semiconductor laser, a gaseous-state laser, a liquid-state laser, or the like may be used.

Specific examples of the laser light include an yttrium aluminum garnet crystal (YAG) laser (wavelengths of 1,064 nm and 1,070 nm) and a laser diode (LD) laser (wavelengths of 808 nm, 840 nm, 940 nm, and 980 nm).

An oscillation mode of the laser light may be a continuous wave (CW), a pulse, or the like. A irradiation method of the laser light is not particularly limited. Examples of the irradiation method of the laser light may include a method of moving a laser head with a robot, a galvano scanning method of performing scanning while reflecting laser light by a mirror, and a method of irradiating a welding surface at the same time from a large number of mounted laser heads.

An output of the laser light is, for example, 1 W to 5 W. As an output of the laser light is higher, laser welding is performed more intensely, which, in return, easily causes poor appearance such as burning.

The shape of the laser irradiation portion W is not particularly limited. For example, as illustrated in FIG. 1 and FIG. 2, the shape is obtained by rounding each of the outer circumference of the cylindrical housing holding portion 73 of the holder 70 and the outer circumference of the cylindrical electric wire holding portion 75 of the holder 70.

A scanning speed of the laser light is, for example, 1 mm/s to 25 mm/s, preferably, 5 mm/s to 20 mm/s, more preferably, 10 mm/s to 15 mm/s. As a scanning speed of the laser light is lower, laser welding is performed more intensely, which, in return, easily causes poor appearance such as burning.

(Effects)

According to the connector 1, it is possible to provide a connector that is waterproof, includes the small number of components, and achieves space saving.

EXAMPLES

The present embodiment is described further in detail with Examples and Comparative Examples, but the present embodiment is not limited to those examples.

Example 1

A test piece formed of the material used for the connector housing 60 and the holder 70 constituting the connector 1 illustrated in FIG. 1 was produced, and weldability was measured.

(Weldability)

Weldability was measured by a laser welding test.

<Test Piece>

A test piece 80 before welding, which had a length 127 mm×a width 12.7 mm×a thickness 1.6 mm, was produced by overlapping a transmission-side plate-like body 85A and an absorption-side plate-like body 85B with each other in a vertical direction. Specifically, the test piece 80 before welding was produced by overlapping the transmission-side plate-like body 85A and the absorption-side plate-like body 85B with each other in the vertical direction in such a way to have an overlapping portion having 30 mm×a width 12.7 mm in the longitudinal direction, and tying and fixing those bodies with a string omitted in illustration.

The transmission-side plate-like body 85A was a plate-like body formed of an example of the material used for the holder 70, and the absorption-side plate-like body 85B was a plate-like body formed of an example of the material used for the connector housing 60.

Specifically, the transmission-side plate-like body 85A was molded by using Duranex (registered trademark) PBT 733LD Na produced by POLYPLASTICS CO., LTD. (a low warpage grade, PBT-GF30 (reinforced with 30% of glass fibers), a natural color). Here, PBT-GF30 indicates a glass-fiber reinforced resin containing 70 mass % of polybutylene terephthalate (PBT) and 30 mass % of glass fibers. PBT-GF30 indicates the same resin in the following examples and the like. The transmission-side plate-like body 85A had a thickness of 1.6 mm, and a laser transmittance of laser light having a wavelength of 1,064 nm was 35%.

The absorption-side plate-like body 85B was molded by using Duranex (registered trademark) PBT 733LD B produced by POLYPLASTICS CO., LTD. (a low warpage grade, PBT-GF30 (reinforced with 30% of glass fibers), a black color). The absorption-side plate-like body 85B had a thickness of 1.6 mm, and a laser transmittance of the laser light having a wavelength of 1,064 nm was 0%.

Table 1 shows the materials and the like of the transmission-side plate-like body 85A and the absorption-side plate-like body 85B.

<Test Method>

Figure 3:
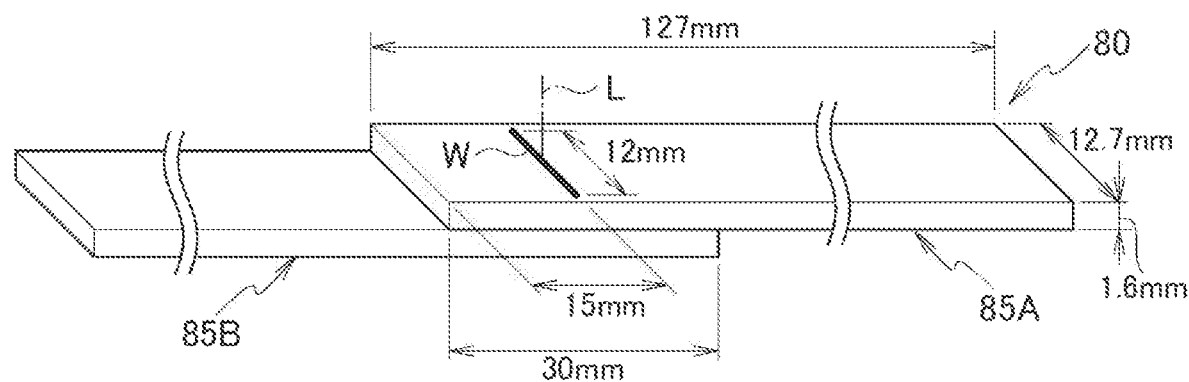
FIG. 3 is a perspective view illustrating a test piece before welding.

Laser marker MD-X1520 produced by KEYENCE Corporation was used as a laser welding device, and the laser irradiation portion W of the test piece 80 before welding, which is illustrated in FIG. 3, was irradiated with the laser light having a wavelength of 1,064 nm. Note that, as illustrated in FIG. 3, the laser irradiation portion W was set in such a way that the longitudinal direction of the 12 mm laser welding width with a laser diameter of 1 mm and a laser welding width 12 mm matches with the width direction of the transmission-side plate-like body 85A. Further, the laser welding width was set in a portion away from the end surface of the transmission-side plate-like body 85A by 15 mm.

Irradiation was performed along the laser irradiation portion W illustrated in FIG. 3 with the laser light L having a CW wave of 2.5 W, for a width of 1 mm at a scanning speed of 10 mm/s. Such irradiation was repeated for 20 times with respect to the same laser irradiation portion W. With this, the transmission-side plate-like body 85A and the absorption-side plate-like body 85B of the test piece 80 before welding were joined in the width direction of the laser irradiation portion W, and thus a test piece after welding was obtained.

<Evaluation Method>

Both the ends of the test piece after welding that was formed of the transmission-side plate-like body 85A and the absorption-side plate-like body 85B were nipped. Subsequently, the test piece after welding was stretched in the longitudinal direction of the transmission-side plate-like body 85A and the absorption-side plate-like body 85B under a force of 100 N for 10 seconds. Then, whether or not the joint portion between the transmission-side plate-like body 85A and the absorption-side plate-like body 85B broke was examined. Breakage was not caused.

The test result regarding weldability is shown in Table 1. Note that, a column regarding weldability in Table 1, a case in which breakage was not caused is indicated with "satisfactory", and a case in which breakage was caused is indicated with "poor".

TABLE 1

| | Transmission-side plate-like body | | | | | Absorption-side plate-like body | | | | | |
|---|---|---|---|---|---|---|---|---|---|---|---|
| | Resin | | | | | Resin | | | | | |
| | Name | Type | Color | Transmittance (%) | Thickness (mm) | Name | Type | Color | Transmittance (%) | Thickness (mm) | Weldability |
| Example 1 | 733LD Na | PBT-GF30 | Natural | 35 | 1.6 | 733LD B | PBT-GF30 | Black | 0 | 1.6 | Satisfactory |
| Example 2 | 1101G30 Na | PBT-GF30 | Natural | 20 | 1.6 | 1101G30 B | PBT-GF30 | Black | 0 | 1.6 | Satisfactory |
| Example 3 | 531HS Na | PBT-GF30 | Natural | 15 | 1.6 | 531HS B | PBT-GF30 | Black | 0 | 1.6 | Poor |
| Example 4 | 1401X06 Na | PBT | Natural | 30 | 1.6 | 1401X06 B | PBT | Black | 0 | 1.6 | Satisfactory |

Example 2

A test piece was produced similarly to Example 1 except that the materials of the transmission-side plate-like body 85A and the absorption-side plate-like body 85B were changed as shown in Table 1, and weldability was measured.

Specifically, the transmission-side plate-like body 85A was molded by using Toraycon (registered trademark) PBT 1101G30 Na produced by TORAY INDUSTRIES, INC (a standard grade, PBT-GF30 (reinforced with 30% of glass fibers), a natural color). The transmission-side plate-like body 85A had a thickness of 1.6 mm, and a laser transmittance of the laser light having a wavelength of 1,064 nm was 20%.

The absorption-side plate-like body 85B was molded by using Toraycon (registered trademark) PBT 1101G30 B produced by TORAY INDUSTRIES, INC (a standard grade, PBT-GF30 (reinforced with 30% of glass fibers), a black color). The absorption-side plate-like body 85B had a thickness of 1.6 mm, and a laser transmittance of the laser light having a wavelength of 1,064 nm was 0%.

During the laser welding test, breakage was not caused. The test result regarding weldability is shown in Table 1.

Example 3

A test piece was produced similarly to Example 1 except that the materials of the transmission-side plate-like body 85A and the absorption-side plate-like body 85B were changed as shown in Table 1, and weldability was measured.

Specifically, the transmission-side plate-like body 85A was molded by using Duranex (registered trademark) PBT 531HS Na produced by POLYPLASTICS CO., LTD. (a hydrolysis-resistant grade, PBT-GF30 (reinforced with 30% of glass fibers), a natural color). The transmission-side plate-like body 85A had a thickness of 1.6 mm, and a laser transmittance of the laser light having a wavelength of 1,064 nm was 15%.

The absorption-side plate-like body 85B was molded by using Duranex (registered trademark) PBT 531HS B produced by POLYPLASTICS CO., LTD. (a hydrolysis-resistant grade, PBT-GF30 (reinforced with 30% of glass fibers), a black color). The absorption-side plate-like body 85B had a thickness of 1.6 mm, and a laser transmittance of the laser light having a wavelength of 1,064 nm was 0%.

During the laser welding test, breakage was caused. The test result regarding weldability is shown in Table 1.

Example 4

A test piece was produced similarly to Example 1 except that the materials of the transmission-side plate-like body 85A and the absorption-side plate-like body 85B were changed as shown in Table 1, and weldability was measured.

Specifically, the transmission-side plate-like body 85A was molded by using Toraycon (registered trademark) PBT 1401X06 Na produced by TORAY INDUSTRIES, INC (a standard grade, PBT, a natural color). 1401X06 Na did not contain glass fibers, and was a resin containing polybutylene terephthalate (PBT) in an amount of 100 mass %. The transmission-side plate-like body 85A had a thickness of 1.6 mm, and a laser transmittance of the laser light having a wavelength of 1,064 nm was 20%.

The absorption-side plate-like body 85B was molded by using Toraycon (registered trademark) PBT 1401X06 B produced by TORAY INDUSTRIES, INC (a standard grade, PBT, a black color). 1401X06 B did not contain glass fibers, and was a resin containing polybutylene terephthalate (PBT) in an amount of 100 mass %. The absorption-side plate-like body 85B had a thickness of 1.6 mm, and a laser transmittance of the laser light having a wavelength of 1,064 nm was 0%.

During the laser welding test, breakage was not caused. The test result regarding weldability is shown in Table 1.

Example 5

A test piece formed of the material used for the coated electric wire 30 and the holder 70 constituting the connector 1 illustrated in FIG. 1 was produced, and sealability was measured.

(Sealability)

Figure 4:
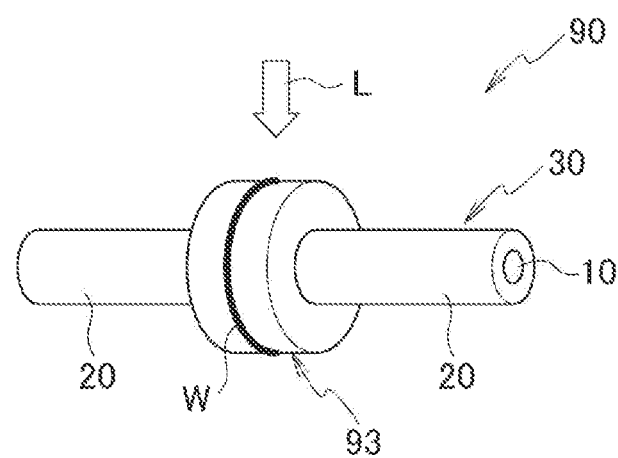
FIG. 4 is a perspective view illustrating a test piece for sealability.

An under-water measurement test sample 100 produced by using a sealability test piece 90 illustrated in FIG. 4 was immersed in water, and sealability between the coating portion 20 of the coated electric wire 30 and a transmission-side cylindrical piece 93 formed of the material used for the holder 70 was measured.

<Test Piece>

First, the sealability test piece 90 including the coated electric wire 30 and the transmission-side cylindrical piece 93, which is illustrated in FIG. 4, was produced.

As the coated electric wire 30, a low-voltage electric wire for an automobile AV2sq produced by YAZAKI Corporation was prepared. AV2sq included the core wire portion 10 that was formed of a conductor of twenty-six soft copper strand wires and an insulator and had an outer diameter of 1.9 mm, and the coating portion 20 that coats the outer circumference of the core wire portion 10 and had a thickness of 0.6 mm, and had an outer diameter of 3.1 mm. The material of the coating portion 20 was polyvinyl chloride (PVC), and the color thereof was black. A laser transmittance of the laser light having a wavelength of 1,064 nm was 0%.

The transmission-side cylindrical piece 93 was molded by using Toraycon (registered trademark) PBT 1401X06 Na produced by TORAY INDUSTRIES, INC (a standard grade, PBT, a natural color). The transmission-side cylindrical piece 93 was molded as a cylindrical shape having an outer diameter of 5.0 mm, an inner diameter of 3.0 mm, and a height of 4.0 mm. 1401X06 Na did not contain glass fibers, and was a resin containing polybutylene terephthalate (PBT) in an amount of 100 mass %. The transmission-side cylindrical piece 93 had a thickness of 1.0 mm in the diameter direction, which was equivalent to a transmission distance of the laser light, and a laser transmittance of the laser light having a wavelength of 1,064 nm was 30%.

The coated electric wire 30 was inserted in a cavity of the transmission-side cylindrical piece 93, which had an inner diameter of 3.0 mm. In a center portion of the outer circumferential side surface of the transmission-side cylindrical piece 93, in other words, a portion at 2.0 mm in the height direction, the laser irradiation portion W was set in such a way to round around the outer circumferential side surface.

Irradiation was performed along the laser irradiation portion W illustrated in FIG. 4 with the laser light L having a CW wave of 2.5 W, for a width of 1 mm at a scanning speed of 10 mm/s. Such irradiation was repeated for 20 times with respect to the same laser irradiation portion W. With this, as illustrated in FIG. 4, the sealability test piece 90 was obtained in which the coated electric wire 30 was inserted in the transmission-side cylindrical piece 93 and the coating portion 20 of the coated electric wire 30 and the transmission-side cylindrical piece 93 were joined in the depth direction of the laser irradiation portion W.

A bottomed tubular jig 95 formed of a bottomed tubular body was prepared. The bottomed tubular body covers, of the coated electric wire 30 inserted in the transmission-side cylindrical piece 93 of the sealability test piece 90, the coated electric wire 30 protruding to one side as viewed from the transmission-side cylindrical piece 93.

The coated electric wire 30 protruding to the one side as viewed from the transmission-side cylindrical piece 93 of the sealability test piece 90 was inserted in the bottomed tubular jig 95 through an opening portion of the bottomed tubular jig 95. An end of the opening portion of the bottomed tubular jig 95 and the transmission-side cylindrical piece 93 abutted against each other, and were welded and sealed with a hotmelt adhesive. With this, as illustrated in FIG. 5, the under-water measurement test sample 100 was produced in which the coated electric wire 30 protruding to the one side as viewed from the transmission-side cylindrical piece 93 of the sealability test piece 90 was arranged in the bottomed tubular jig 95 and the side close to the bottomed tubular jig 95 was sealed.

Table 2 shows the materials and the like of the transmission-side cylindrical piece 93 and the coating portion 20 of the coated electric wire 30.

<Test Method>

Figure 5:
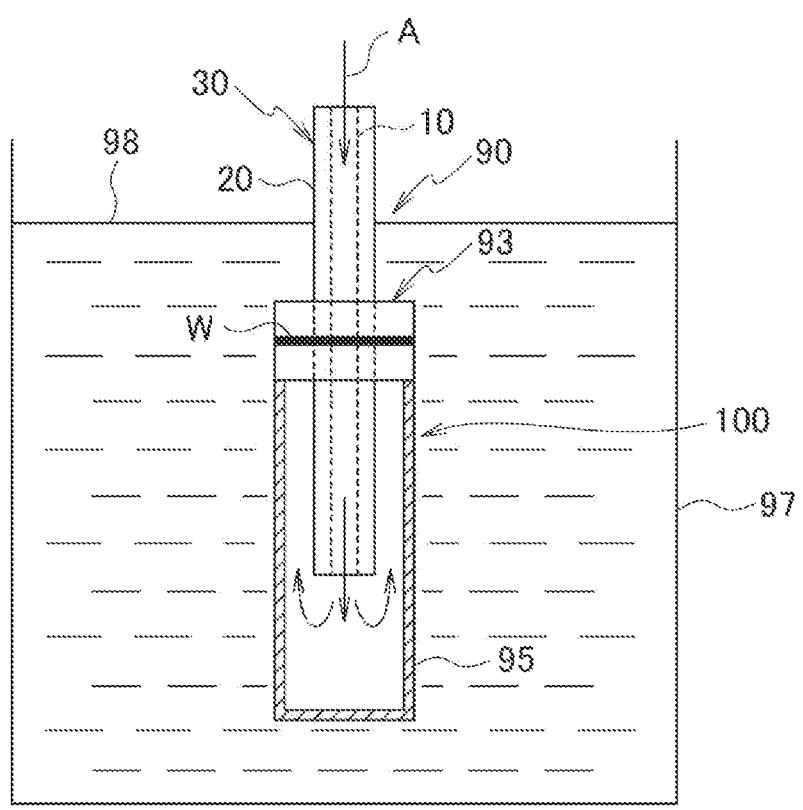
FIG. 5 is a view illustrating a sealability test.

As illustrated in FIG. 5, water 98 was reserved in a water tank 97, and the side sealed with the bottomed tubular jig 95 and the transmission-side cylindrical piece 93 of the under-water measurement test sample 100 were immersed in the water 98. At this state, the end of the coated electric wire 30 on the side of the under-water measurement test sample 100 that was not sealed with the bottomed tubular jig 95 was arranged above the water 98. With this, an air A was injected from the end surface of the core wire portion 10 of the coated electric wire 30 of the under-water measurement test sample 100 that was partially immersed in the water 98 in the water tank 97, and hence the air A was injected inside the coated electric wire 30 and the bottomed tubular jig 95 via gaps of the wires of the core wire portion 10.

During the test, the air A was injected under a pressure of 200 kPa from the end surface of the core wire portion 10 of the coated electric wire 30 of the under-water measurement test sample 100 that was partially immersed in the water 98 in the water tank 97. Immediately after that, the side sealed with the bottomed tubular jig 95 and the transmission-side cylindrical piece 93 of the under-water measurement test sample 100 were immersed in the water 98. This state was maintained and left for 30 seconds, and whether or not an air leaked between the coating portion 20 of the coated electric wire 30 and the transmission-side cylindrical piece 93 to generate bubbles was observed.

Bubbles were not generated. Table 2 shows the test result regarding sealability.

Note that the under-water measurement test sample 100 was left at a temperature of 100° C. for 120 hours in accordance with JASO D616 (year of 2021) 6.22 high-temperature shelf test standard, and thus the under-water measurement test sample 100 subjected to a thermal history was produced. The under-water measurement test sample 100 subjected to a thermal history was similarly tested for sealability as described above, and bubbles were not generated. Table 2 shows the test result regarding sealability of the under-water measurement test sample 100 subjected to a thermal history.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrical connector, comprising:
    a coated electric wire including a core wire portion and a coating portion that covers an outer circumference of the core wire portion;

TABLE 2

| | Transmission-side cylindrical piece | | | | | Coating portion of coated electric wire | | | | Sealability | |
|---|---|---|---|---|---|---|---|---|---|---|---|
| | Resin | | | | | Resin | | | | | |
| | Name | Type | Color | Transmittance (%) | Thickness (mm) | Name | Type | Color | Transmittance (%) | Normal temperature | 100° C., 120 Hr |
| Example 5 | 1401X06 Na | PBT | Natural | 30 | 1.0 | AV2sq | PVC | Black | 0 | 200 kPa or higher | 200 kPa or higher | a connector terminal including a connection portion that is connected to a terminal portion of the coated electric wire and is connected to an external member;

a connector housing including:
- an insertion portion having an insertion hole in which the coated electric wire is inserted;
- a housing portion that is provided to extend from the insertion portion to a front surface side, and surrounds a periphery of the terminal portion of the coated electric wire inserted in the insertion hole; and
- an electric wire covering portion that is provided to extend in such a way that an inner wall surface of the insertion hole protrudes to a back surface side of the insertion portion, and covers an outer circumference of the coating portion of the coated electric wire; and a holder including:
- a housing holding portion that holds an outer surface of the electric wire covering portion; and
- an electric wire holding portion that holds an outer circumference of at least a part of the coating portion of the coated electric wire protruding from the electric wire covering portion to a back surface side, wherein sealing between the housing holding portion of the holder and the electric wire covering portion of the connector housing and sealing between the electric wire holding portion of the holder and the coating portion of the coated electric wire are performed by laser welding.

2. The electrical connector according to claim 1, wherein in the holder, the housing holding portion, the electric wire holding portion, a holder connection portion are integrated with one another, the holder connection portion connecting the housing holding portion and the electric wire holding portion to each other.

3. The electrical connector according to claim 2, wherein in the holder, the housing holding portion having a cylindrical shape and the electric wire holding portion having a cylindrical shape with a diameter smaller than the housing holding portion are connected to each other in a longitudinal direction via the holder connection portion having a ring shape.

4. The electrical connector according to claim 1, wherein the holder has a laser transmittance of 20% or higher.

5. The electrical connector according to claim 1, wherein the connector housing has a laser transmittance of 10% or lower.

6. The electrical connector according to claim 1, wherein laser light used for the laser welding has a wavelength from 800 nm to 1,100 nm.

* * * * *